US008285273B2

(12) United States Patent
Roth

(10) Patent No.: US 8,285,273 B2
(45) Date of Patent: Oct. 9, 2012

(54) SYSTEM AND METHOD FOR CONDUCTING A SEARCH USING A WIRELESS MOBILE DEVICE

(75) Inventor: Daniel L. Roth, Boston, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 376 days.

(21) Appl. No.: 12/350,848

(22) Filed: Jan. 8, 2009

(65) Prior Publication Data

US 2009/0117885 A1 May 7, 2009

Related U.S. Application Data

(63) Continuation of application No. 11/263,601, filed on Oct. 31, 2005, now Pat. No. 7,477,909.

(51) Int. Cl.
*H04W 4/00* (2009.01)
(52) U.S. Cl. .................. 455/422.1; 455/466; 705/26.62; 704/235
(58) Field of Classification Search ............... 455/422.1, 455/466, 563; 704/235; 705/26.6, 26.62; 707/3, 5; 379/379
See application file for complete search history.

(56) References Cited

U.S. PATENT DOCUMENTS

| 5,689,547 A * | 11/1997 | Molne ........................... 379/379 |
| 6,028,601 A * | 2/2000 | Machiraju et al. ............ 715/705 |
| 6,031,467 A | 2/2000 | Hymel et al. |
| 6,084,583 A | 7/2000 | Gerszberg et al. |
| 6,128,651 A | 10/2000 | Cezar |
| 6,141,010 A | 10/2000 | Hoyle |
| 6,157,841 A | 12/2000 | Bolduc et al. |
| 6,298,218 B1 | 10/2001 | Lowe et al. |
| 6,332,127 B1 | 12/2001 | Bandera et al. |
| 6,381,465 B1 | 4/2002 | Chern et al. |
| 6,397,057 B1 | 5/2002 | Malackowski et al. |
| 6,401,085 B1 | 6/2002 | Gershman et al. |
| 6,452,498 B2 | 9/2002 | Stewart |
| 6,484,148 B1 | 11/2002 | Boyd |
| 6,529,159 B1 | 3/2003 | Fan et al. |
| 6,552,682 B1 | 4/2003 | Fan |
| 6,560,456 B1 | 5/2003 | Lohtia et al. |
| 6,608,556 B2 | 8/2003 | De Moerloose et al. |
| 6,647,269 B2 | 11/2003 | Hendrey et al. |

(Continued)

FOREIGN PATENT DOCUMENTS

EP 0 854 417 A2 7/1998

(Continued)

OTHER PUBLICATIONS

Dalianis et al., "SiteSeeker Voice—A speech controlled search engine," (Feb. 25, 2003), http://www.nada.kth.se/hercules/wapalizer/SiteSeekerVoice.html> retrieved on Oct. 30, 2006.

(Continued)

*Primary Examiner* — William D Cumming
(74) *Attorney, Agent, or Firm* — Wolf, Greenfield & Sacks, P.C.

(57) ABSTRACT

A method and system are provided by which a wireless mobile device takes a vocally entered query and transmits it in a text message format over a wireless network to a search engine; receives search results based on the query from the search engine over the wireless network; and displays the search results.

30 Claims, 6 Drawing Sheets

U.S. PATENT DOCUMENTS

| | | | |
|---|---|---|---|
| 6,664,922 | B1 | 12/2003 | Fan |
| 6,769,010 | B1 | 7/2004 | Knapp et al. |
| 6,789,077 | B1 * | 9/2004 | Slaughter et al. ............ 1/1 |
| 6,826,614 | B1 | 11/2004 | Hanmann et al. |
| 6,842,767 | B1 | 1/2005 | Partovi et al. |
| 6,862,445 | B1 | 3/2005 | Cohen |
| 6,885,736 | B2 | 4/2005 | Uppaluru |
| 6,941,273 | B1 * | 9/2005 | Loghmani et al. ......... 705/26.62 |
| 6,978,136 | B2 | 12/2005 | Jenniges et al. |
| 6,980,834 | B2 * | 12/2005 | Gupta et al. ............ 455/563 |
| 7,136,846 | B2 | 11/2006 | Chang et al. |
| 7,359,723 | B2 | 4/2008 | Jones |
| 7,477,909 | B2 * | 1/2009 | Roth ............... 455/466 |
| 2001/0051517 | A1 | 12/2001 | Strietzel |
| 2002/0087408 | A1 | 7/2002 | Burnett |
| 2003/0125958 | A1 | 7/2003 | Alpdemir et al. |
| 2004/0006478 | A1 | 1/2004 | Alpdemir et al. |
| 2004/0076279 | A1 | 4/2004 | Taschereau |
| 2004/0140989 | A1 | 7/2004 | Papageorge |
| 2004/0203766 | A1 | 10/2004 | Jenniges et al. |
| 2004/0224662 | A1 | 11/2004 | O'Neil et al. |
| 2005/0004840 | A1 | 1/2005 | Wanninger |
| 2005/0021744 | A1 | 1/2005 | Haitsuka et al. |
| 2005/0033582 | A1 | 2/2005 | Gadd et al. |
| 2005/0054381 | A1 | 3/2005 | Lee et al. |
| 2006/0004627 | A1 | 1/2006 | Baluja |
| 2006/0150119 | A1 | 7/2006 | Chesnais et al. |
| 2006/0264209 | A1 * | 11/2006 | Atkinson et al. ........... 455/422.1 |
| 2007/0032229 | A1 | 2/2007 | Jones |
| 2007/0099636 | A1 * | 5/2007 | Roth ............... 455/466 |
| 2007/0169143 | A1 | 7/2007 | Li |
| 2007/0174244 | A1 | 7/2007 | Jones |
| 2007/0174273 | A1 * | 7/2007 | Jones et al. ............ 707/5 |
| 2007/0174904 | A1 | 7/2007 | Park |
| 2007/0185768 | A1 | 8/2007 | Vengroff et al. |
| 2007/0185841 | A1 * | 8/2007 | Jones et al. ............ 707/3 |
| 2007/0185843 | A1 | 8/2007 | Jones et al. |
| 2008/0027707 | A1 | 1/2008 | Stefik et al. |
| 2009/0030680 | A1 * | 1/2009 | Mamou ............ 704/235 |

FOREIGN PATENT DOCUMENTS

| | | |
|---|---|---|
| EP | 1 143 679 A2 | 10/2001 |
| WO | WO 00/77978 A2 | 12/2000 |
| WO | WO 01/91488 A1 | 11/2001 |
| WO | WO 02/31814 A1 | 4/2002 |
| WO | WO 02/41169 A1 | 5/2002 |
| WO | WO 2004/054217 A1 | 6/2004 |
| WO | WO 2005/020094 A1 | 3/2005 |

OTHER PUBLICATIONS

Hemphill et al., "Surfing the Web by Voice," *Proceedings ACM Multimedia*, Nov. 1995, 215-222 (Nov. 1995).

White, M., "Multimodal interaction and the mobile Web, Part 2: Simple searches with Find-It", (Feb. 6, 2005), http://www.128.ibm.com/developerworks/web/library/wi-mobweb2/> retrieved on Oct. 31, 2006.

International Search Report and Written Opinion PCT/US2006/038411 mailiang date Mar. 5, 2007.

*Nokia 616 Car Kit*, [online] [retrieved on Sep. 29, 2005]. Retrieved from the Internet <URL: http://europe.nokia.com/nokia/0,65324,00.html>.

Google Short Message Service (SMS), [online] [retrieved on Sep. 29, 2005}. Retrived from the Internet ,URL: http://www.google.com/sms/>.

* cited by examiner

SYSTEM AND METHOD FOR CONDUCTING A SEARCH USING A WIRELESS MOBILE DEVICE

RELATED APPLICATION

This is a continuation of prior application Ser. No. 11/263,601 filed Oct. 31, 2005, entitled "SYSTEM AND METHOD FOR CONDUCTING A SEARCH USING A WIRELESS MOBILE DEVICE," which is herein incorporated by reference in its entirety.

FIELD OF THE INVENTION

The invention relates to a wireless mobile device based search system, and specifically to submitting queries on a wireless mobile device.

BACKGROUND OF THE INVENTION

The need for faster and easier access to information has never been greater in this internet era. The popularization of wireless mobile devices has made it possible to obtain any information wherever and whenever. Currently, most of the mobile devices on the market have browser capability that provides internet access. But navigating through the various links and web pages to find the right information is not an easy task, especially on a small screen of a mobile device. In addition, only a relatively small percentage of the all websites on the internet offers a Wireless Application Protocol (WAP) version of themselves for display on wireless mobile devices.

Text messaging based information retrieval systems such as the Google™ Short Message Service eliminates the need for web pages and browsers on a mobile device by allowing users to send queries and receive answers as text messages. They provide a more dynamic and efficient way to get the desired information, but a major deficiency of these systems is that many of the mobile devices, such as a cellular phone, are tiny and have tiny numeric keypads and screens that make it very difficult to enter text for a Short Message Service (SMS) message. The only text input method available on most involves pressing numeric keys once, twice or three times to select one of the alphabetical characters associated with it. This makes for very slow input, and discourages users from utilizing features like the Google™ SMS.

The present invention addresses these problems.

SUMMARY OF THE INVENTION

The invention relates to a system and method for obtaining and displaying information content from sources external on a wireless mobile device based on a spoken query.

In one aspect, a method of obtaining query results on a mobile device is provided. In one embodiment a user is presented with a list of available queries on a mobile device such as a cellular phone. The query list can be customized based on the current location of the user or in response to a prior search history stored on the mobile device. After the user selects a query verbally, the mobile device prompts the user for additional information required to complete the query. The user is able to provide the needed information verbally using speech recognition software. In one embodiment once the query is complete, it is automatically converted to a SMS format, addressed to a search engine, and transmitted over the mobile phone network to a search engine. Search results based on the query are sent back to the mobile device also in SMS format from the search engine. Once received, the search results are reformatted by the mobile device and displayed on the screen of the mobile device.

In another embodiment, the search results are sent to an intermediary server on the mobile phone network. In addition to formatting, in another embodiment the intermediary server also processes advertisements and appends the advertisements to the search results. In various embodiments, the added advertisements originate at the search engine; at an advertisement provider on the network; or directly from a particular vendor of goods and services. The formatted search results and advertisements are then forwarded to the mobile device for display. In yet another embodiment, upon receiving the search results, the mobile device uses text to speech synthesis to generate a voice speaking the received search results in addition to displaying them on the screen of the mobile device.

In another aspect, the invention relating to a system for obtaining query results on a mobile device is provided. In one embodiment the system includes a wireless mobile device, a wireless network, and a search engine. According to this embodiment, the wireless mobile device includes a voice input, a speech to text converter, a text to text protocol converter, a wireless transmitter, and a wireless receiver. The search engine includes a search engine receiver and a search engine transmitter. The voice input is converted to a message format and transmitted by the wireless transmitter through the wireless network to the search engine. The search engine then transmits search results to the wireless receiver for display.

In another aspect, the present invention relates to a method of monetizing a search performed by a wireless mobile device. The method includes the steps of speaking a query to the wireless mobile device; transmitting the query from the wireless mobile device over a wireless network to a search engine; receiving search results by the wireless mobile device from the search engine over the wireless network; receiving advertisements by the wireless mobile device over the wireless network; formatting the search results and the advertisements; displaying the search results and the advertisements on the wireless mobile device; and recovering a monetary remuneration from the originator of the advertisements in response to the query. In different embodiments, the originator may be the search engine, or an advertisement provider, or a particular vendor of goods and services.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

Figure 1:
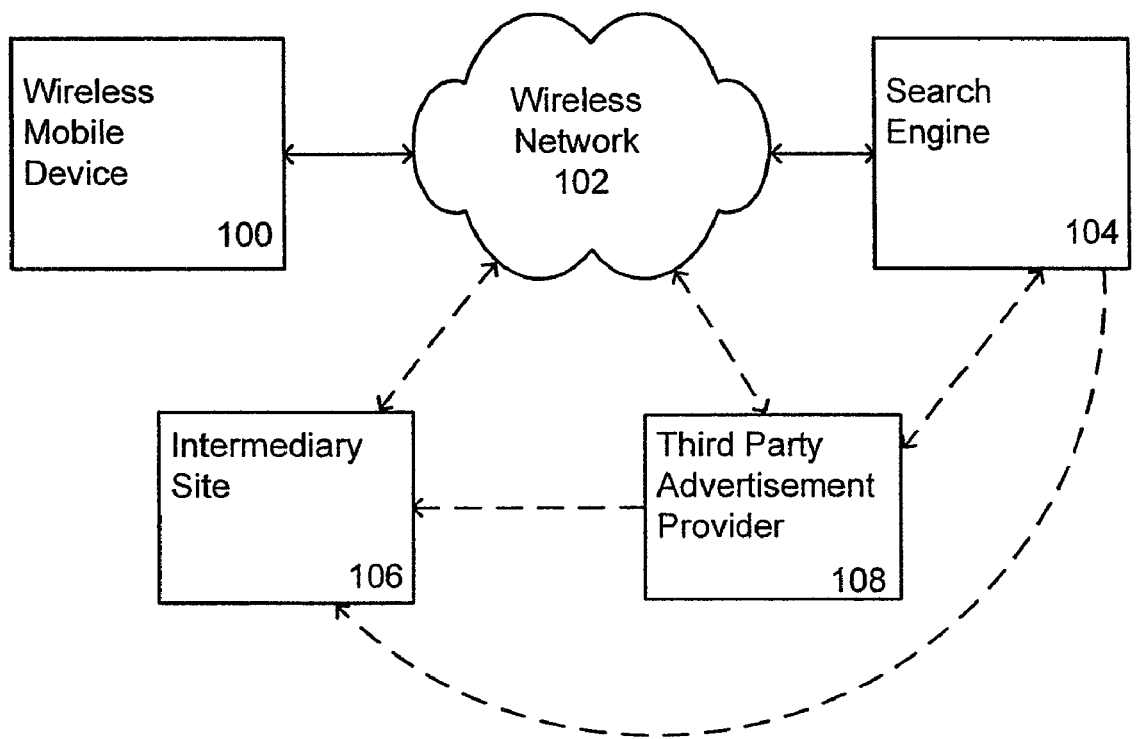
FIG. 1 is a block diagram illustrating a search system according to an embodiment of the present invention.

FIG. 1 is an overview of a voice query search system according to an embodiment of the invention. The search system includes a wireless mobile device 100, a wireless network 102, a search engine 104, and optionally an intermediary site 106, and a third party advertisement provider 108. The wireless mobile device 100 is the primary I/O device that allows its user to submit a verbal query and displays search results based on the query. The wireless network 102 is a channel between the wireless mobile device 100 and the search engine 104, where the actual search takes place. Search results may be reformatted at the wireless mobile device 100, the search engine 104, the optional intermediary site 106, or the third party advertisement provider 108. The formatted search results may be combined with advertisements provided by the search engine 104, the third party advertisement provider 108 or preloaded on the wireless mobile device 100 itself.

In various embodiments the wireless mobile device 100 is a cellular phone, a PDA, a BlackBerry®, or any other similar device equipped with voice recognition technology that allows a user to input information verbally. The wireless network 102 can be any existing telecommunication network to which the wireless mobile device 100 is connected. For example, if the wireless mobile device 100 is a cellular phone, the wireless network 102 is the mobile phone network providing service to that particular phone. While connected to the wireless network 102, the wireless mobile device 100 is able to send and receive information to other devices that have access to the same wireless network 102.

After receiving a query over the wireless network 102, the search engine 104 generates search results and sends the search results back over the wireless network 102 to the wireless mobile device 100. In addition to the results of the query, the search engine 104 is also able to send advertisements to the wireless mobile device 100. The search engine 104 may have the advertisements stored locally or may request the advertisements for a third party advertisement provider 108. Alternatively the search engine 104 may redirect the third party advertisement provider 108 to send the advertisements directly to the wireless mobile device 100.

Before the search results are displayed on the wireless mobile device 100, they are formatted to fit on the small screen of such device. Such formatting may take place on the wireless mobile device 100 itself, at the intermediary site 106, at the third party advertisement provider 108, or the search engine 104. In the process of formatting, additional information such as advertisements or other information can be also added to the search results. The additional information may or may not originate at the location where the formatting occurs. The additional information may be obtained concurrently with the search results if the information comes from the search engine 104, or may be already stored locally at the formatting site. The additional information is appended to the search results and transmitted over the wireless network 102 to the wireless mobile device 100. In one embodiment, the additional information also serves as the subject of future queries by embedding a link to another function. For example, the link could be a map query function that provides directions to a destination returned as a part of the search results. The intermediary site 106 and the third party advertisement provider 108 may communicate with each other and with the search engine 104 and the wireless mobile device 100 over the wireless network 102.

Formatting may also occur on the wireless mobile device 100 itself. For example, advertisements which are pre-stored on the wireless mobile device 100 may also be formatted along with the search results. In addition, pre-formatted advertisements provided by external entities may be sent to the wireless mobile device 100 periodically or in response to the occurrence of certain events. For example, the issuing of a query or the movement of the wireless mobile device 100 into a particular area may trigger a fresh download of advertisements.

After receiving the search results, either directly from the search engine 104 or from the intermediary site 106, the wireless mobile device 100 displays the search results on its screen. In one embodiment, the wireless mobile device uses a text to speech synthesis process to generate a voice speaking the search results.

The provider of the disclosed technology may collect a license fee for providing an advertisement platform from the various advertisement suppliers including the search engine 104, the intermediary site 106, and the third party advertisement provider 108. In addition, revenue generated by each of the suppliers from selling advertisements to its customers is shared with the provider of the disclosed technology in return for utilizing the technology to display advertisements with search results on the wireless mobile device 100.

Figure 2:
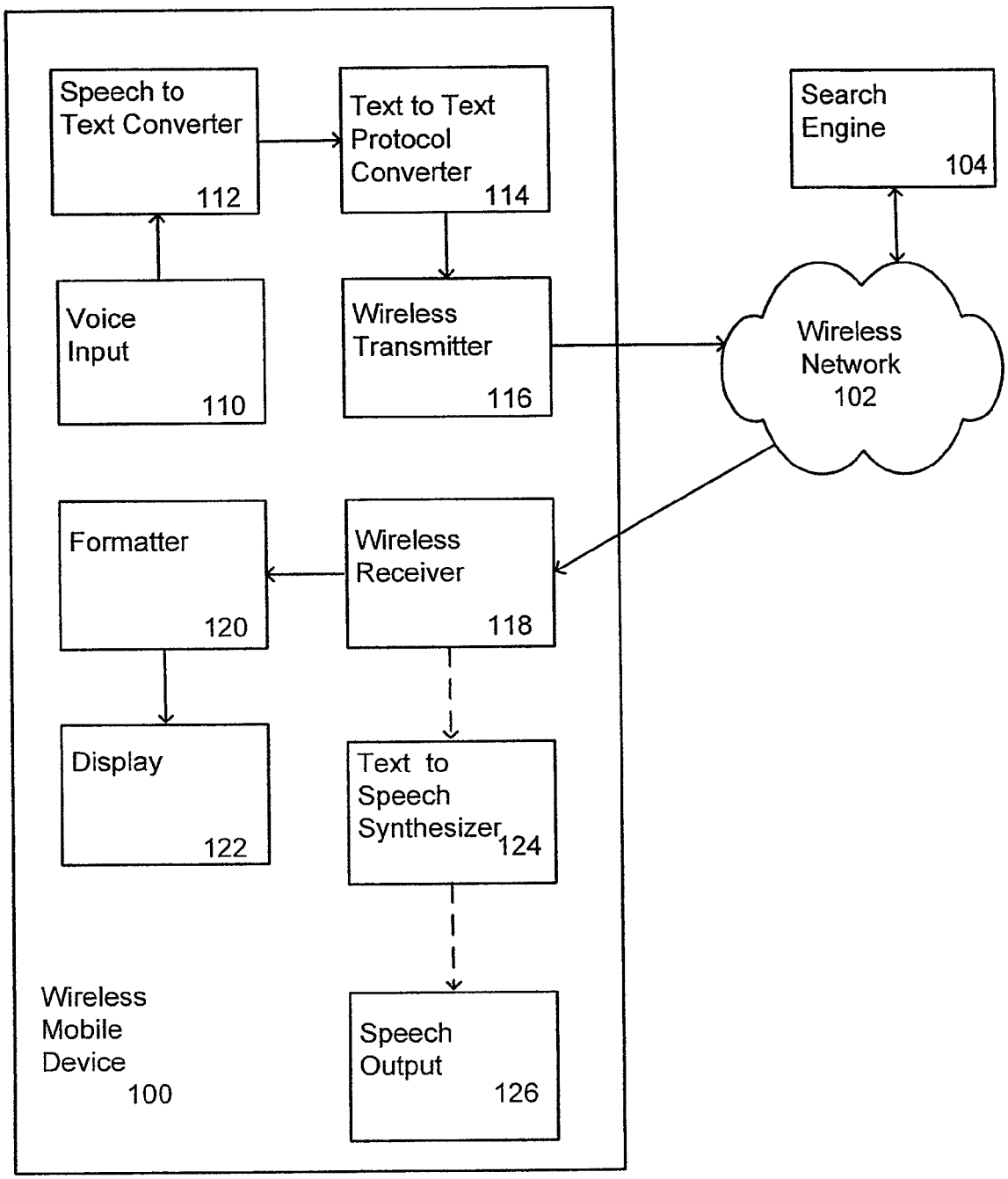
FIG. 2 is a block diagram depicting the various components of an embodiment of a wireless mobile device as the Input/Output interface of the search system.

FIG. 2 is a block diagram depicting the various components of a wireless mobile device 100 according to an embodiment of the present invention. The wireless mobile device 100 includes a voice input 110 such as a microphone which is electrically connected to a speech to text converter 112. The speech to text converter converts 112 the spoken word to a text string output. The output of the speech to text converter 112 is the input signal to a text to text protocol converter 114, which processes the text string into the desired format required for text transmission over the network. The formatted text is sent to a wireless transmitter 116 for transmission over the network 102.

The wireless mobile device also includes a wireless receiver 118 which receives the results of the query over the network 102 and which transmits the results to a formatter 120 for display on a display 122. In another embodiment the results are transmitted additionally or optionally to a text to speech synthesizer 124 for audible output 126.

The speech based input mechanism of the wireless mobile device 100 generally obviates the need for numerous key presses that would otherwise be necessary to address the SMS message, type in its contents in the proper query format expected by the search engine 104, and to organize the multiple SMS messages received from a single query. Since nothing is typed, the user is not aware SMS messaging is being used to issue queries and receive results. The voice recognition and speech synthesis technology provide a seamless way to input a query without the need to use the keypad or look at the display of the wireless mobile device 100.

In the case where the system does not recognize the response to a request for more information, the user can type in the requested information. In this embodiment, the formatting of the query utilizes both the input from the voice recognition portion of the system and the input from the keypad.

In operation, the wireless mobile device 100 receives via its voice input 110 a query spoken by a user. The spoken query is converted by the speech to text converter 112 to text. The text is then converted by the text to text protocol converter 114 to a text message. An existing protocol for transmitting such a text message is SMS, which transmits short text messages to and from a mobile device. An alternative protocol is Multimedia Message Service (MMS) which transmits graphics, sound files, and video clips in addition to plain text. The text message is transmitted by the wireless transmitter 116 to an external wireless network 102. When search results become available, they are received in a text message format from the wireless network 102 through the wireless receiver 118 of the wireless mobile device 100. The text message is sent to the formatter 120, which formats the search results for display on the display 122 of the mobile wireless device 100, and the display 122 displays them. Formatted information is ordered and presented in an easily digestible way. The search results in one embodiment are displayed in a window that occupies about two thirds of the top portion of the display 122. A scroll bar is shown on the right frame of the window if the search results do not all fit in the window. Advertisements and other information are displayed on the remaining portion of the display 122 below the search results.

Figure 3:
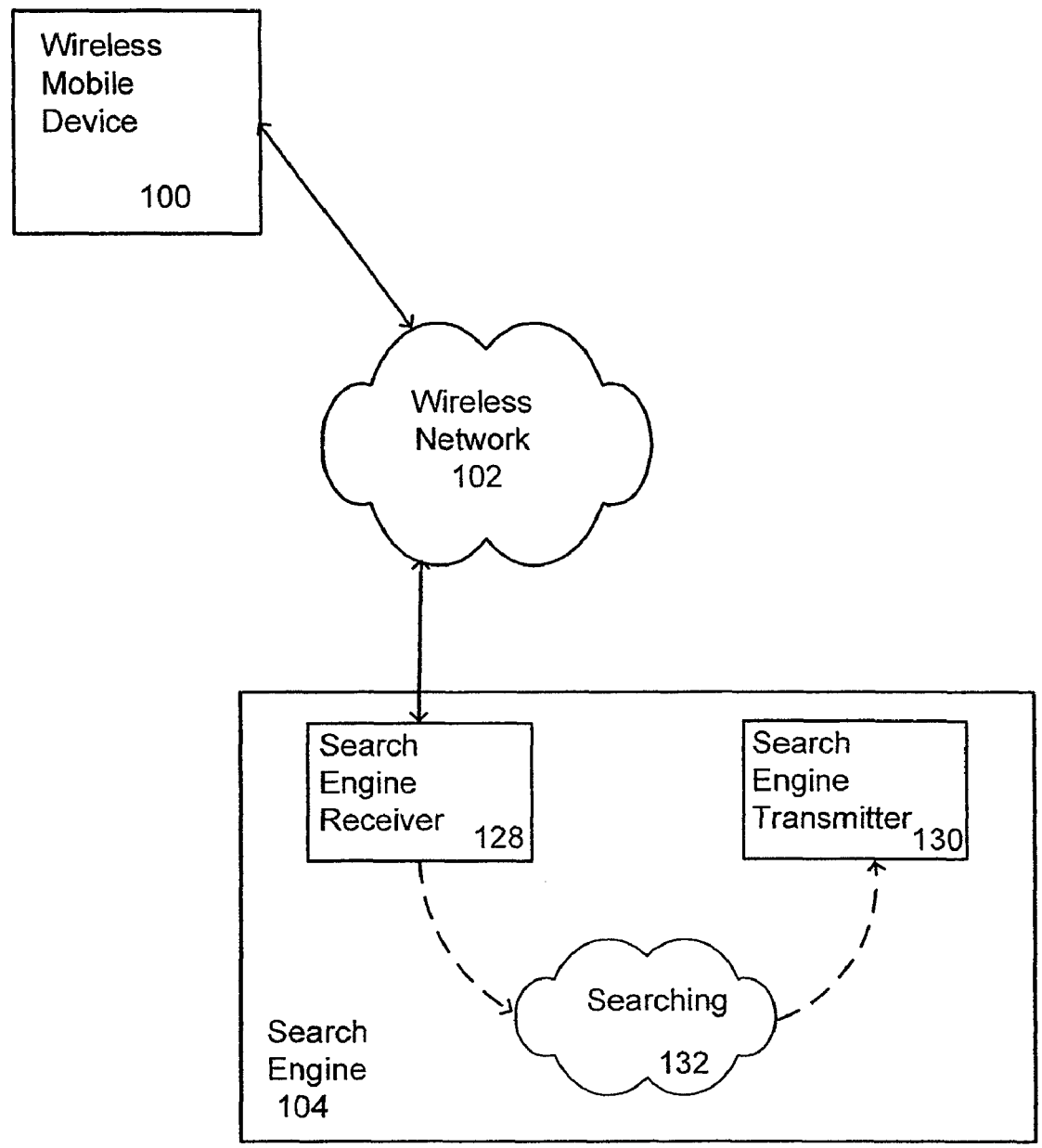
FIG. 3 is a block diagram depicting the various components of an embodiment of a search engine as a part of the search system.

FIG. 3 is a block diagram depicting the various components of a search engine 104 as an embodiment of the present invention. The search engine 104 includes a search engine receiver 128 and a search engine transmitter 130, the former receives text messages from the wireless network 102 and the latter dispatches search results to the wireless network 102. In communication with the search engine receiver 128 and the search engine transmitter 130, is the actual search engine which performs the search, lists the search results, and generates to the requisite text format.

Figure 4:
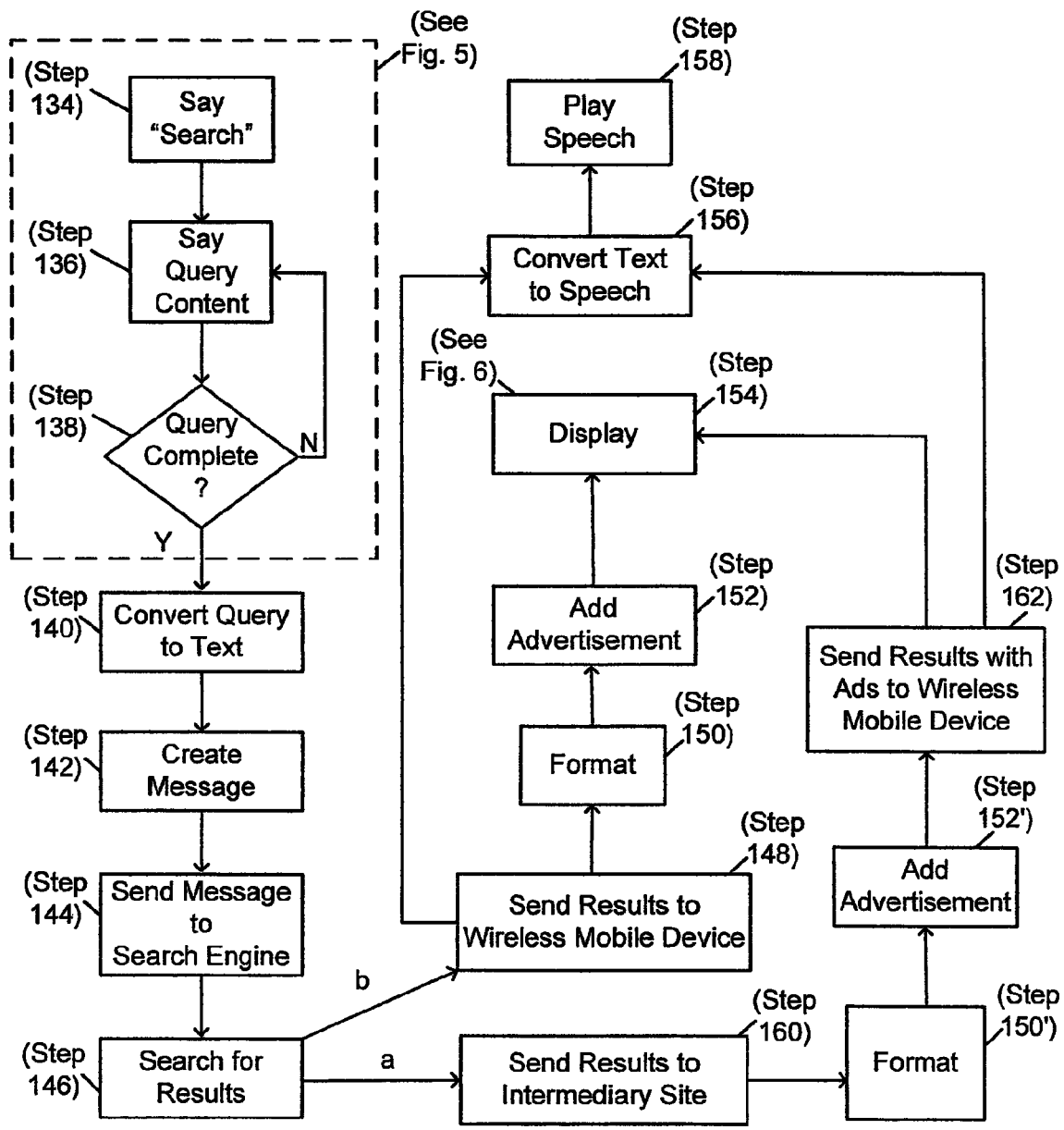
FIG. 4 is a high-level flow chart illustrating exemplary steps involved in submitting a query and receiving results by using the search system according to an embodiment of the invention.
Figure 5:
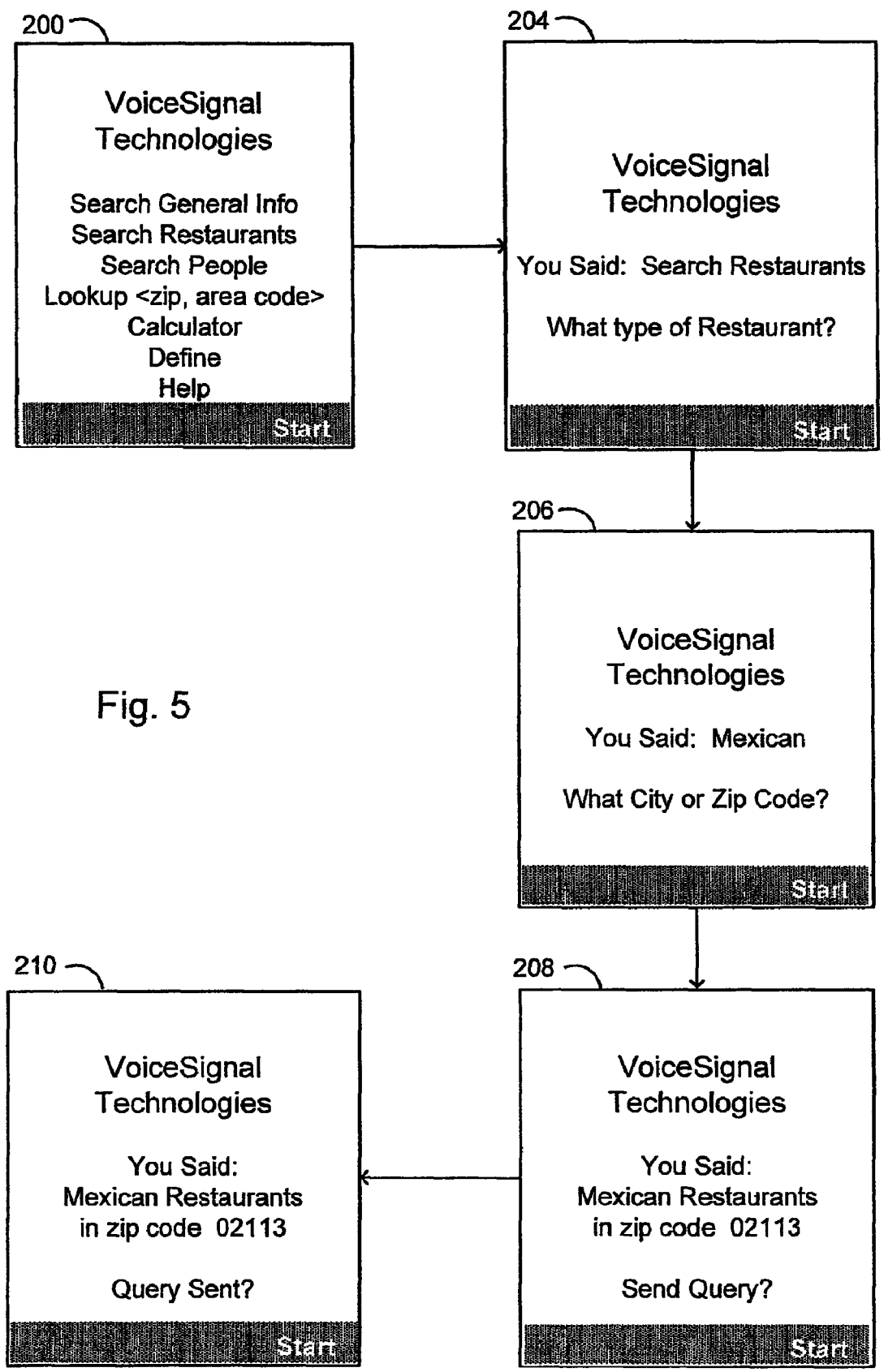
FIG. 5 is a flow chart illustrating an example of a dialog between the wireless mobile device and its user for inputting a search query according to an embodiment of the invention.

FIG. 4 is flowchart illustrating exemplary steps in more detail involved in submitting a query and receiving results according to an embodiment of the invention. FIG. 5 depicts the various displays that would appear on the mobile device screen and/or be audibly spoken by the mobile device also according to the embodiment of the invention. Instead of entering information by using the key pad of the wireless mobile device 100, a user speaks a command to such device 100 to initiate a search (Step 134). Upon receiving the command, the wireless mobile device 100 displays a list 200 (FIG. 5) of predefined queries which may be selected. The list can be based on the present location of the user or in response to a prior search history stored in the device 100. An example of such a list may contain categories such as movie, weather, restaurant and business.

After a selection is made vocally by the user, the wireless mobile device 100 continues a dialog with the user to obtain the requisite information to complete the query (Step 136). The wireless mobile device 100 may use speech synthesis, pre-recorded speech, and/or visual display to prompt the user for such information. For example, if the user selects the Restaurant category, the user will then be prompted to provide the type of restaurant 204 (FIG. 5) and the city or zip code in which to search for the restaurant 206 (FIG. 5). If the user fails to answer properly or if the wireless mobile device is not able to recognize the user's verbal input, the step is repeated until valid information is provided (Step 138). After a predetermined number of failed attempts to input the query, the wireless mobile device 100 returns an error message and the user is given an option to restart from the beginning.

If all the required valid information is entered, the user instructs the device to send the query 208 (FIG. 5). The flow of the dialog, including some of the displayed material, will be predetermined by the wireless service provider, the wireless mobile device manufacturer, and/or periodically updated remotely by them or by the search engine 104. In the restaurant search, the information requested and the order in which they are requested are provided this way. The actual selections that may be made in response to each of the requests are dynamically updated. For example, the acceptable types of cuisines and geographic limitations of the search may be updated when new restaurants are added. After the query is complete, it is converted first to text (Step 140) and the text to message format (Step 142). The text message is then transmitted over the wireless network 102 to the search engine 104 (Step 144) and the user is notified that the query has been sent 210 (FIG. 5).

In one embodiment, the wireless network 102 automatically detects the location of the wireless mobile device 100 and passes that information along with the text message to the search engine 104. The location may be used in selecting advertisements to be returned with the search results in the following steps. Alternatively mobile devices with Global Positioning System (GPS) capability can transfer its location directly to the search engine without the requirement of mobile network triangulation.

After the search engine 104 receives the text message specifying the query, it generates corresponding search results (Step 146), which are sent back to the wireless mobile device 100 (Step 148) over the wireless network 102 in text message format. The search results are then formatted (Step 150) and have advertisements added to them on the wireless mobile device 100 (Step 152). In another embodiment, the search results are sent to an intermediary site 106 (Step 160), where they are formatted (Step 150') and appended with advertisements (Step 152'). The advertisements originate from either the search engine 104 or an advertisement provider 106. They are either transmitted via a SMS or MMS message over the wireless network 102 or stored in the form of bitmaps locally on the wireless mobile device 100 or the intermediary site 106 before being formatted. The selection of advertisements is based on factors including the particular search results returned and the location of the wireless mobile device 100. When a query generates multiple search results, each is appended with a different advertisement and sent via separate responsive SMS or MMS messages.

Figure 6:
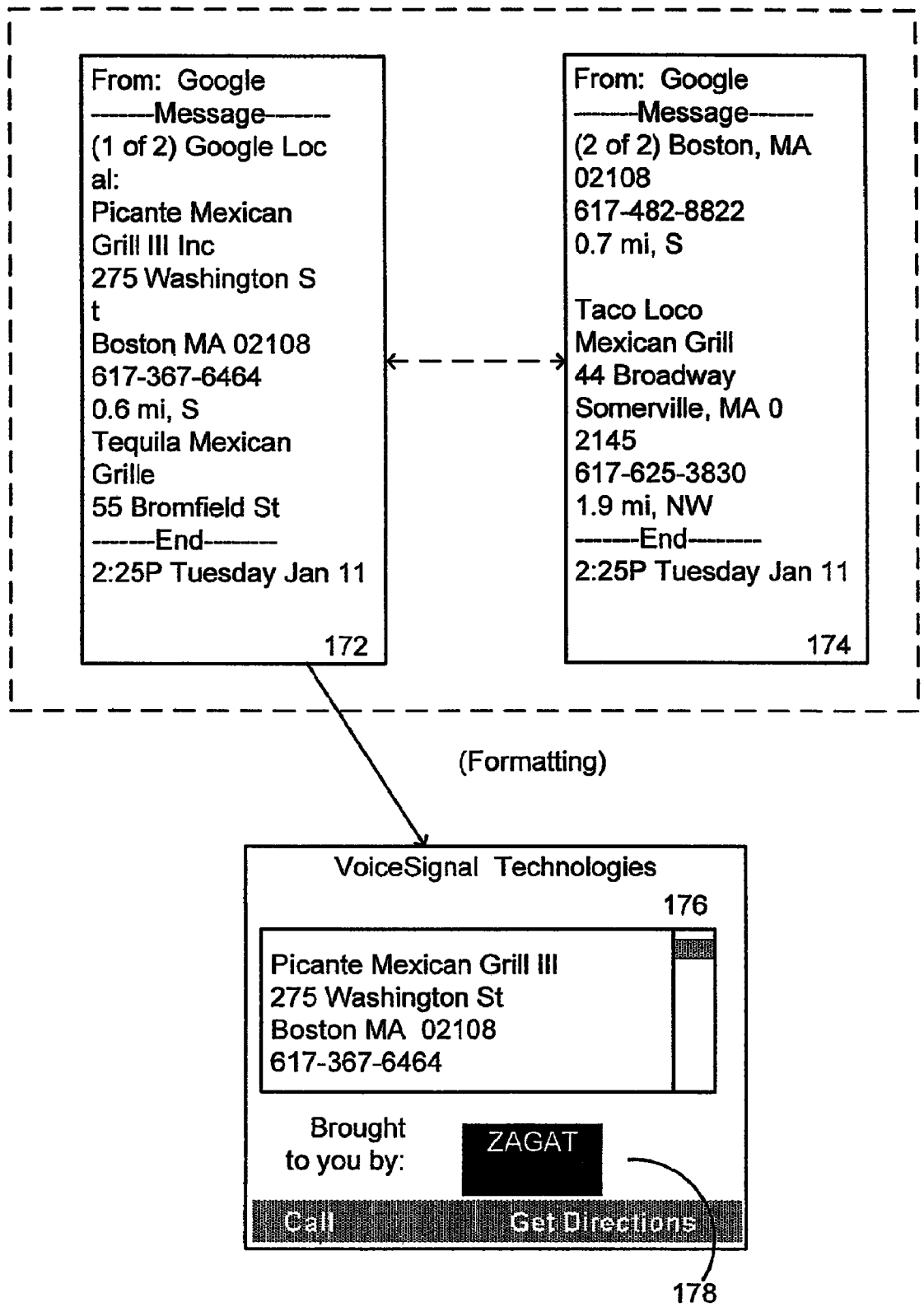
FIG. 6 is a block diagram depicting an example of search results in multiple SMS messages before and after being formatted.

After receiving the search results, either directly from the search engine 104 (Step 148) or from the intermediary site 106 (Step 162), the wireless mobile device 100 displays the search results on its screen (Step 154). Alternatively, it uses a text to speech synthesis process (Step 156) to generate a voice speaking the search results (Step 158) in addition to the screen display (Step 154). When there are multiple search results received in separate SMS or MMS messages 172, 174 (FIG. 6) the messages must be reformatted for a proper display on the screen. Thus the SMS message must be parsed and reformatted for display 176 and the addition of advertisements 178. The user may use keypad on the wireless mobile device 100 or by giving a voice command, depending on the output mechanism, to go back and forth between the search results.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for obtaining query results on a wireless mobile device, the method comprising:
   receiving a spoken query at the wireless mobile device;
   converting, at and via the mobile device, the spoken query into a text query;
   transmitting the text query by the mobile device using a text messaging protocol over a wireless network addressed to an internet search engine;
   receiving from the search engine search results responsive to the text query, the search results being communicated over the wireless network using the messaging protocol; and
   the wireless mobile device communicating the search results to a user of the wireless mobile device.

2. The method of claim 1, wherein the text query is not displayed on the wireless mobile device.

3. The method of claim 1, wherein the wireless network is a mobile phone network and the wireless mobile device is a mobile phone.

4. The method of claim 1, further comprising formatting the search results on the wireless mobile device.

5. The method of claim 1, wherein communicating the search results to the user of the wireless mobile device comprises displaying the search results on a display of the wireless mobile device.

6. The method of claim 5, further comprising:
   receiving advertisements; and
   displaying the advertisements with the search results on the display of the wireless mobile device.

7. The method of claim 6, further comprising formatting the advertisements and the search results on the wireless mobile device.

8. The method of claim 1, wherein communicating the search results to the user of the wireless mobile device comprises:
   synthesizing speech from the received search results on the wireless mobile device to generate a voice speaking the search results.

9. A method for use on a wireless mobile device, the method comprising:
   receiving at the wireless mobile device a spoken command requesting a query;
   receiving at the wireless mobile device spoken information for the query;
   based on the spoken command and the spoken information, generating text at the wireless mobile device that specifies the requested query;
   formatting, in the wireless device, from the generated text, the text for a text messaging protocol to create a message in the text messaging protocol, specifying the query;
   addressing the message to an internet search engine; and
   transmitting the message from the wireless device, over a wireless network, to the search engine.

10. The method of claim 9, further comprising, in response to receipt of the spoken command, prompting for the information for the query by visual prompt.

11. The method of claim 9, further comprising, in response to receipt of the spoken command, prompting for the information for the query by audio prompt.

12. The method of claim 11, wherein the audio prompt is pre-recorded and stored on the mobile device.

13. The method of claim 11, wherein the audio prompt is synthesized on the mobile device.

14. The method of claim 10, wherein the command specifies a particular query from among list of available queries on the wireless mobile device.

15. The method of claim 14, wherein the list of available queries is based on a prior search history stored on the wireless mobile device.

16. The method of claim 14, wherein the list of available queries is based on a location of the wireless mobile device.

17. The method of claim 14 wherein the list of available queries is pre-stored on the wireless mobile device.

18. The method of claim 14, wherein the list of available queries is downloadable from a remote site.

19. The method of claim 9, further comprising receiving, over the wireless network, search results produced by the search engine in response to the query.

20. The method of claim 19, further comprising formatting the search results.

21. The method of claim 19, further comprising displaying the search results on the wireless mobile device.

22. The method of claim 19, further comprising communicating the search results to a user of the wireless mobile device.

23. A system for providing search results in response to a query, the system comprising:
   a wireless mobile device;
   a search engine system; and
   at least one communication channel that couples the wireless mobile device to the search engine;
   wherein the wireless mobile device comprises
      a voice input to receive spoken speech,
      a speech to text converter in communication with the voice input,
      a text to text protocol converter in communication with the speech to text converter,
      a wireless transmitter in communication with the text to text protocol converter and the at least one communication channel, and
      a wireless receiver in communication with the at least one communication channel; wherein the search engine system comprises
      a search engine receiver in communication with the at least one communication channel,
      a search engine in communication with the search engine receiver, and
      a search engine transmitter in communication with the search engine and the at least one communication channel;
   wherein spoken speech received at the voice input is converted by the wireless mobile device to text that requests a search;
   wherein the text that requests a search is transmitted by the wireless transmitter through the at least one communication channel to the search engine system; and
   wherein in response to receipt of the text that requests a search, the search engine system transmits results for the search through the at least one communication channel to the wireless mobile device.

24. A wireless mobile device comprising:
   a voice input to receive spoken speech;
   a speech to text converter in communication with the voice input to convert spoken speech into text that specifies a search command and a search query;

a wireless transmitter to transmit the search query at least partially through a wireless communication medium, using a text messaging protocol, addressed to an internet search engine; and a receiver in communication with the wireless communication medium to receive search results provided by the search engine, using the text messaging protocol, responsive to the search query.

25. The wireless mobile device of claim 24, further comprising a visual display that is adapted to display the received search results.

26. The wireless mobile device of claim 24, further comprising a speech synthesizer that receives the search results in textual form and generates a voice speaking the search results.

27. The method of claim 1, further comprising:
   receiving at least one advertisement at the wireless mobile device over the wireless network via a messaging protocol;
   communicating the search results further comprising
      (1) formatting the search results and the at least one advertisement, and
      (2) displaying the search results and the at least one advertisement on the wireless mobile device; and
   charging a fee for displaying the at least one advertisement.

28. The method of claim 27, wherein the at least one advertisement is received from the search engine and the fee is charged to the search engine.

29. The method of claim 27, wherein the at least one advertisement is originated from an advertisement provider and the fee is charged to the advertisement provider.

30. The method of claim 27, wherein the at least one advertisement is originated from a vendor of goods and services and the fee is charged to the vendor.

* * * * *